June 14, 1966  P. GANCEL  3,255,847
DISC BRAKE

Original Filed Dec. 27, 1961  2 Sheets-Sheet 1

INVENTOR.
PIERRE GANCEL
BY
Sheldon F. Raizes
ATTORNEY

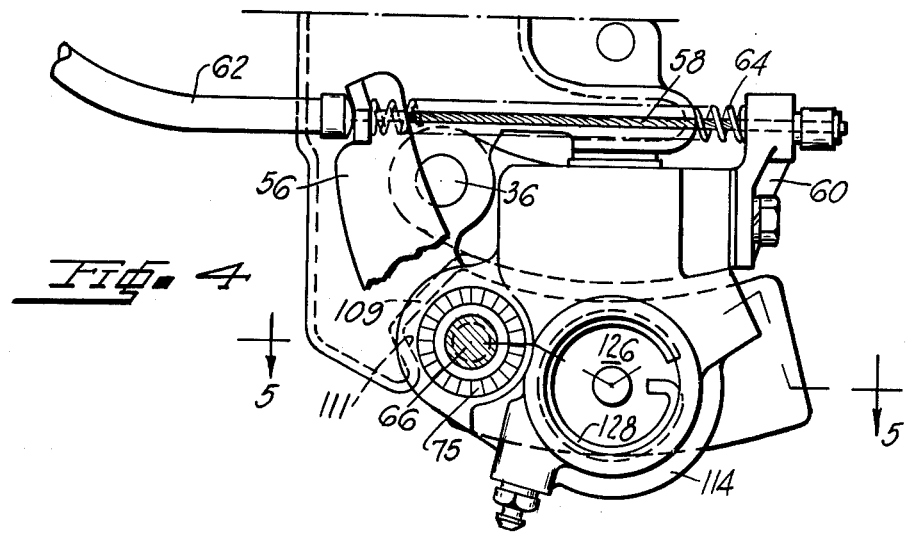
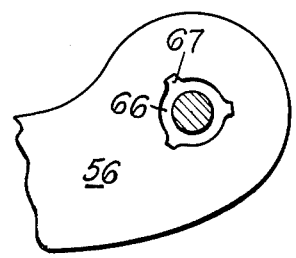
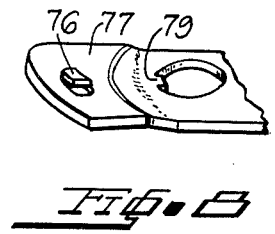
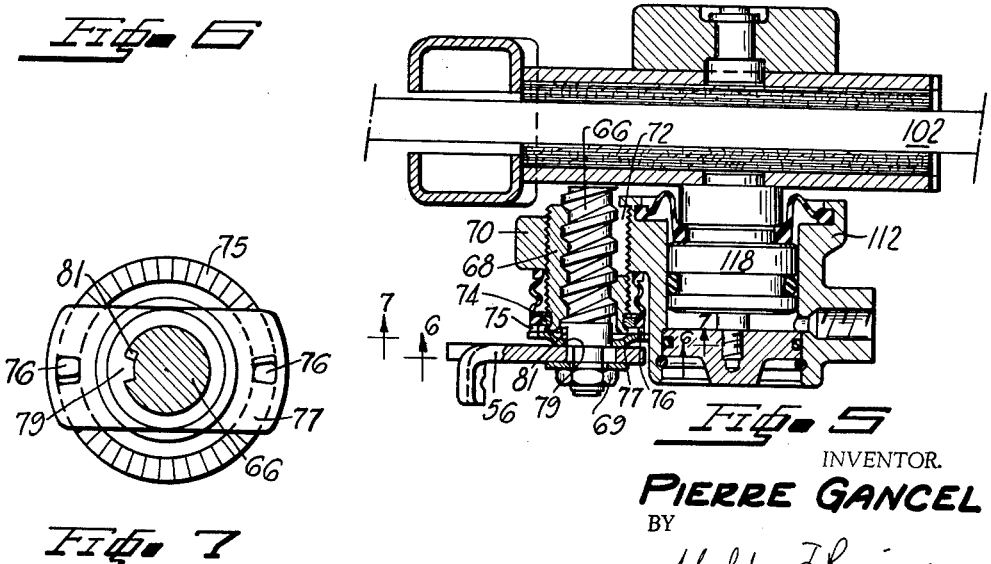

United States Patent Office 3,255,847
Patented June 14, 1966

3,255,847
DISC BRAKE
Pierre Gancel, Paris, France, assignor to Societe Anonyme D.B.A., Paris, France, a company of France
Original application Dec. 27, 1961, Ser. No. 162,377, now Patent No. 3,155,194, dated Nov. 3, 1964. Divided and this application Sept. 15, 1964, Ser. No. 396,525
7 Claims. (Cl. 188—72)

This application is a division of my copending parent application Serial No. 162,377, filed December 27, 1961, now U.S. Patent No. 3,155,194.

This invention relates to an automatic adjustor for a disc brake.

More particularly, this invention relates to automatic adjusting means adapted to be incorporated in a hand brake control and comprises a screw provided with a low pitch thread having inclined sides which is in threaded engagement with a sleeve mounted on the housing and provided with axial slots. When this screw is brought into rotation by the control lever, it effects a radial expansion of the sleeve which action locks the sleeve on its support. The sleeve is threaded on its outer surface and screwed into a bore formed in the housing and is provided with a ratchet wheel which cooperates with a pawl connected to the screw so that when the clearance between the linings and the disc exceeds a predetermined value, the screw rotates the sleeve with respect to its support to reestablish the initial clearance.

Advantages of the invention will appear in the following description and in the accompanying drawings, in which:

FIGURE 4 is a view similar to FIGURE 1 and shows another embodiment of the invention equipped with a hand-operated control;

FIGURE 5 is a view in cross section taken along line 5—5 of FIGURE 4 and showing the construction of the automatic adjusting device incorporated in the hand control;

FIGURE 6 is a view taken along section line 6—6 of FIGURE 5;

FIGURE 7 is a view taken along section line 7—7 of FIGURE 5; and

FIGURE 8 is a view of a washer illustrated in FIGURES 5 and 7.

Figure 1:
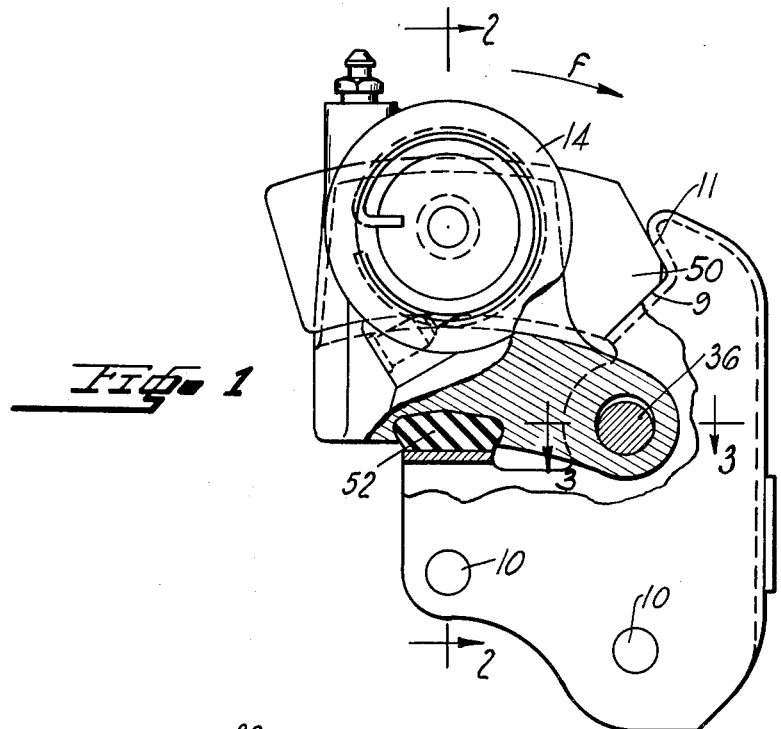
FIGURE 1 is an elevated view partly in cross section of a disc brake made in accordance with the present invention.
Figure 2:
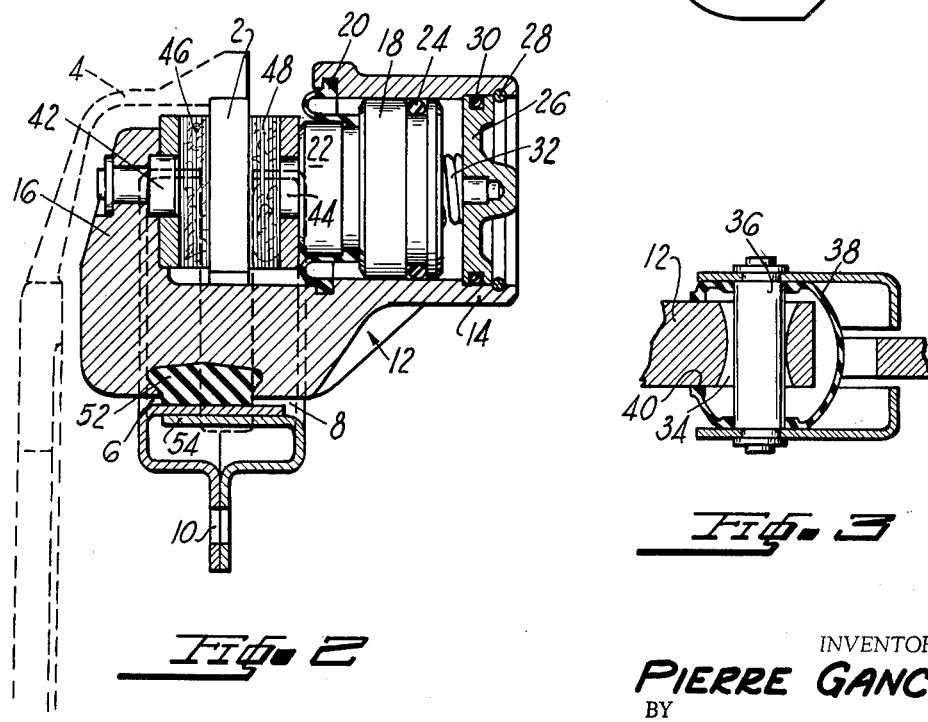
FIGURE 2 is a view in cross section taken along line 2—2 of FIGURE 1 and showing the housing comprising a cylinder arranged to one side of the disc and a pressure plate arranged to the other side of the disc.
Figure 3:
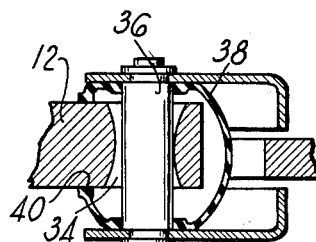
FIGURE 3 is a partial view, in cross section taken along line 3—3 of FIGURE 1 and showing the arrangement of the housing on an axle which is carried by two plates forming part of the fixed support.

The brake shown in the drawings comprises a rotatable disc 2 driven at its outside periphery by connection to a bell 4, drawn in outline in FIGURE 2, which also restrains the disc from motion in the axial direction. The fixed support of the brake comprises two plates 6 and 8 connected to a fixed member of the vehicle, such as the axle spindle, by means of bolts which are not shown, and which pass through aligned holes 10 arranged in said plates near the disc axis. The plates 6 and 8 may be connected one to the other by welding and form abutment surfaces 9 and 11 to which reference will be made hereinafter.

The control mechanism comprises a housing designated in general by the reference numeral 12. The housing comprises a cylinder 14, arranged on one side of the disc and a pressure plate 16 arranged on the opposite side of the disc.

A piston 18 equipped with a sealing boot 20 is mounted in the cylinder. The respective ends of the boot are attached on the one hand to the cylinder and, on the other hand, to a head 22 of reduced diameter which is provided on the working end of the piston. The periphery of the piston is provided with a groove in which a resilient sealing ring 24 is arranged. The elasticity of this ring may also be used to aid the return of the piston when the hydraulic pressure ceases to act upon the latter.

The bottom of the cylinder 14 comprises a closure member 26 locked by a stop ring 28. A sealing ring 30 is interposed between the periphery of the closure member and the wall of the cylinder. An automatic adjusting device, which might be of the type described in French patent application No. 828,069, filed on May 24, 1960 in the name of the company, "The Bendix Corporation," and corresponding U.S. application Serial No. 110,227, filed October 10, 1960, now abandoned, is interposed between the piston and the bottom of the cylinder. This device comprises a spring 32, the purpose of which is to permit, by compressing, a temporary retraction of the piston in case of deflection of the disc and then to return the piston back to its normal position.

The housing 12 is provided with a bearing bore 34 through which passes a shaft 36 having a diameter less than that of the smallest portion of the bearing bore, the opposite ends of the shaft being fixed to the two plates 6 and 8 once the mounting of the housing is effected. The housing 12 is thus adapted to slide and rotate on the shaft and the inner surface of the bearing bore 34 is convex so that it gives to the housing a freedom of movement which permits the latter to adjust its position angularly to that of the disc in the event of misalignment of the disc or deflection of the latter.

It should be observed that the inner surface of the bearing bore 34 is not machined after casting and actually establishes a broad contact between the housing 12 and the shaft 36 which facilitates the sliding of the housing. It should also be noted that the shaft 36 braces the plates 6 and 8, which reinforces the rigidity of the fixed support. An envelope 38 made of plastic material surrounds the shaft 36 and forms a sealed enclosure which is filled with grease to facilitate the sliding of the housing 12 on the axle 36. This envelope has an opening 40 through which extends the adjacent portion of the housing.

The pressure plate 16 and the piston 18 are provided with bosses 42, 44, respectively, which are fitted into sockets in the pads 46, 48 arranged on opposite sides of the disc. The pads are thus rigidly joined to the housing 12. The maximum length of the bosses is equal to the clearance provided between the piston 18 and the bottom of the cylinder 14. The abutment surfaces 9 and 11 provided on the fixed support form a V-shaped recess against which the corresponding shaped ends 50 of the pads in the forward braking direction indicated by the arrow "f."

To insert the pads, it is only necessary to displace the housing 12 with respect to the disc 2. This may be done by pushing the piston 18 inwardly against the action of the spring 32, by an amount sufficient to permit the pads to be inserted and the bosses 42, 44 to be fitted into the sockets provided in the pads. The ends 50 of the pads should be placed in the V-shaped recesses provided on the fixed support and the housing pushed by angular rotation about the shaft 36 against a block 52 of elastomeric material carried by joined elements 54 of the fixed support. The block 52 is thus compressed between the housing and the fixed support.

In forward braking, the admission of a fluid under pressure into the cylinder 14, causes a displacement of the piston 18 which applies the pad 48 against the adjacent surface of the disc 2. The action of the fluid under pressure on the bottom of the cylinder also causes the housing 12 to slide along the shaft 36 and applies the pad 46 against the opposite face of the disc by means of pressure plate 16.

In rearward braking, that is, in the direction opposite to the arrow "f," the braking effort exerted on the friction pads, which are connected to the housing by the bosses 42, 44, is transmitted to the fixed support through the housing which rotates about the shaft 36, the shock of this transmission being absorbed by the block 52 of elastic material.

The embodiment shown in FIGURES 4 and 5 is similar to that previously described, the elements having a function identical to those described above being designated in these figures by the same reference numerals increased by 100.

The disc brake shown in FIGURES 4 and 5 comprises a hand control including a lever 56 actuated by a cable-sheath assembly. The cable 58 is hooked to a bracket 60 attached to the housing. The sheath 62 abuts on the lever 56 and a spring 64 interposed between the bracket 60 and the lever 56 maintains the latter in its normal position. The lever 56 is splined to the end portion of screw 66, which comprises three angularly spaced ribs 67 received in complementary slots of the lever and is attached thereto by means of a nut 69. The screw 66 is in threaded engagement with a sleeve 68 which has a plurality of axial slots 72. The sleeve 68 is threaded on its outer surface and is screwed into a bore formed on an embossment 70 of the housing 112. A wheel 74 having ratchet teeth 75 formed on its outer face is attached by suitable means, as by means of a bent flange, to the sleeve 68. The ratchet teeth 75 cooperate with two diametrically opposed pawls 76 formed on a resilient washer 77 mounted on the end portion of the screw 66 and having a lost motion connection therewith. This lost motion connection is provided by a tab 79 formed on the washer 77 and received in a longitudinal groove 81 formed in the screw 66 and having a larger circumferential extent than the tab. The pawls 76 are struck from the washer 77 and are resiliently biased against the ratchet teeth of the wheel 74 by the resiliency of the washer. A clearance is provided between the radially outer portion of the washer 77 and the adjacent surface of the lever 56 to allow the pawls to climb over the ratchet teeth.

Because of the lost motion connection between the screw 66 and the washer 77, the latter is driven in rotation by the screw only after the lever 56 and the screw 66 have rotated over an angle equal to the angular clearance between the washer and screw which corresponds to the normal clearance of the brake.

Let us assume that pawls 76 have picked up a new tooth upon rotation of the screw and lever in excess of the angular clearance corresponding to the lost motion connection. When the brake lever is released the lever and screw will rotate over said angular clearance before the washer 77 is driven thereby. Thereafter the washer 77 and in turn the sleeve 68 are rotated by the screw 66, and the assembly lever 56, screw 66 and sleeve 68 are moved towards the friction pad. With the described construction the screw 66 is always moved away from the friction pad a predetermined distance before adjustment occurs. Upon release of the brake the sleeve 68 is allowed to rotate closer to the disc in order to reestablish the initial clearance between the linings and disc since the screw 66 is no longer loaded by the reactive force of the pad.

It is to be understood that the above described arrangements are simply illustrative of the application of the principles of the invention. Numerous other arrangements may be devised by those skilled in the art which will embody the principles of the invention and fall within the scope thereof.

I claim:

1. In a brake: a rotor having a pair of opposed friction surfaces thereon, a housing extending opposite one of said friction surfaces, a friction element located between said housing and said one friction surface for engaging the same, an actuating mechanism for applying said friction element against said rotor, said actuating mechanism comprising a pair of members threadedly connected to each other, a threaded connection between one of said members and said housing, the other of said members engaging said friction element, the pitch of said threaded connection between said members being greater than the pitch of said threaded connection between said one member and said housing, means for rotating said other member, a lost motion drive connection between said members being so constructed to allow relative movement between said members when said other member is rotated in one direction and for rotating said members for shifting the same as a unit in a direction toward said one friction surface after a predetermined relative rotation between said members when said other member is rotated in the opposite direction to thereby adjust the position of said members in accordance to the wear of said friction element.

2. In a brake: a rotor having a pair of opposed friction surfaces thereon, a housing extending opposite one of said friction surfaces, a friction element located between said housing and said one friction surface for engaging the same, an actuating mechanism for applying said friction element against said rotor, said actuating mechanism comprising a threaded elongated member for engaging said friction element, an internally and externally threaded sleeve surrounding said elongated member and threadedly connected thereto, a threaded opening in said housing, said elongated member and said sleeve extending through said opening, said sleeve being threadedly connected to said opening, the pitch of said threaded connection between said elongated member and sleeve being greater than the pitch of said threaded connection between said sleeve and said housing, said actuating mechanism further comprising means for rotating said elongated member, a lost motion driving connection between said elongated member and said sleeve and being so constructed to allow relative rotation between said elongated member and said sleeve when said elongated member is rotated in one direction and for rotating said sleeve with said elongated member for shifting the same as a unit in a direction toward said one friction surface after a predetermined relative rotation between said elongated member and said sleeve when said elongated member is rotated in the opposite direction to adjust the position of said actuating means in accordance to the wear of said friction element.

3. The structure as recited in claim 2 wherein said lost motion driving connection is a ratchet connection so constructed to allow relative rotation between said elongated member and said sleeve during brake application and effecting said driving connection therebetween after a predetermined relative rotation therebetween upon release of the brake.

4. The structure as recited in claim 2 wherein said lost motion driving connection comprises ratchet teeth means on one of said members and pawl means on the other of said members for engaging said ratchet teeth, a lost motion connection between said elongated member and its respective said means, said pawl means and ratchet teeth means being constructed to allow slippage between said pawl means and said teeth during rotation of said elongated member in a brake applying direction and to effect a driving connection between said pawl means and said teeth after a predetermined relative rotation between said elongated member and said sleeve in a brake release direction.

5. The structure as recited in claim 4 wherein said ratchet teeth are carried by said sleeve and said pawl means is carried by said elongated member.

6. In a brake: a rotor having a pair of opposed friction surfaces therein, a housing extending opposite one of said friction surfaces, a friction element located between said housing and said one friction surface for engaging the same, an actuating mechanism for applying said friction element against said rotor, said actuating mechanism comprising a pair of members one carried by the other, a threaded connection between said other member and said housing, said one member operatively engaging said friction element, means for actuating said one member, said members having means for effecting movement of said one member relative to said other member when moved in one direction, a lost motion drive connection between said members being so constructed to allow relative movement between said members when said one member is moved in one direction and for rotating said other member for shifting said members as a unit in a direction toward said one friction surface after a predetermined relative movement between said members when said one member is moved in the opposite direction to thereby adjust the position of said members in accordance to the wear of said friction element.

7. In a brake: a rotor having a pair of opposed friction surfaces thereon, a housing extending opposite one of said friction surfaces, a friction element located between said housing and said one friction surface for engaging the same, an actuating mechanism for applying said friction element against said rotor, said actuating mechanism comprising a pair of members one rotatably carried by the other, a threaded connection between said other member and said housing, said one member operatively engaging said friction element, means for rotating said one member, said members having means for effecting movement of said one member relative to said other member when rotated in one direction, a lost motion drive connection between said members being so constructed to allow relative movement between said members when said one member is rotated in said one direction and for rotating said members for shifting the same as a unit in a direction toward said one friction surface after a predetermined relative rotation between said members when said one member is rotated in the opposite direction to thereby adjust the position of said members in accordance to the wear of said friction element.

No references cited.

MILTON BUCHLER, *Primary Examiner.*

G. HALVOSA, *Assistant Examiner.*